Figure 1:
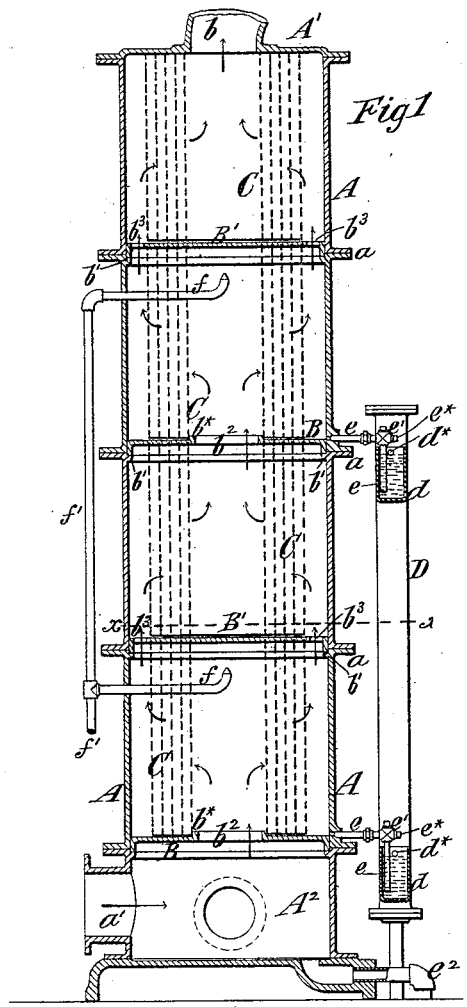

(No Model.) 3 Sheets—Sheet 1.

C. W. ISBELL.
GAS SCRUBBER.

No. 328,408. Patented Oct. 13, 1885.

Witnesses:
Henry Hau
Matthew Pollock

Inventor:
Chas. W. Isbell
by his attys
Brown & Hall

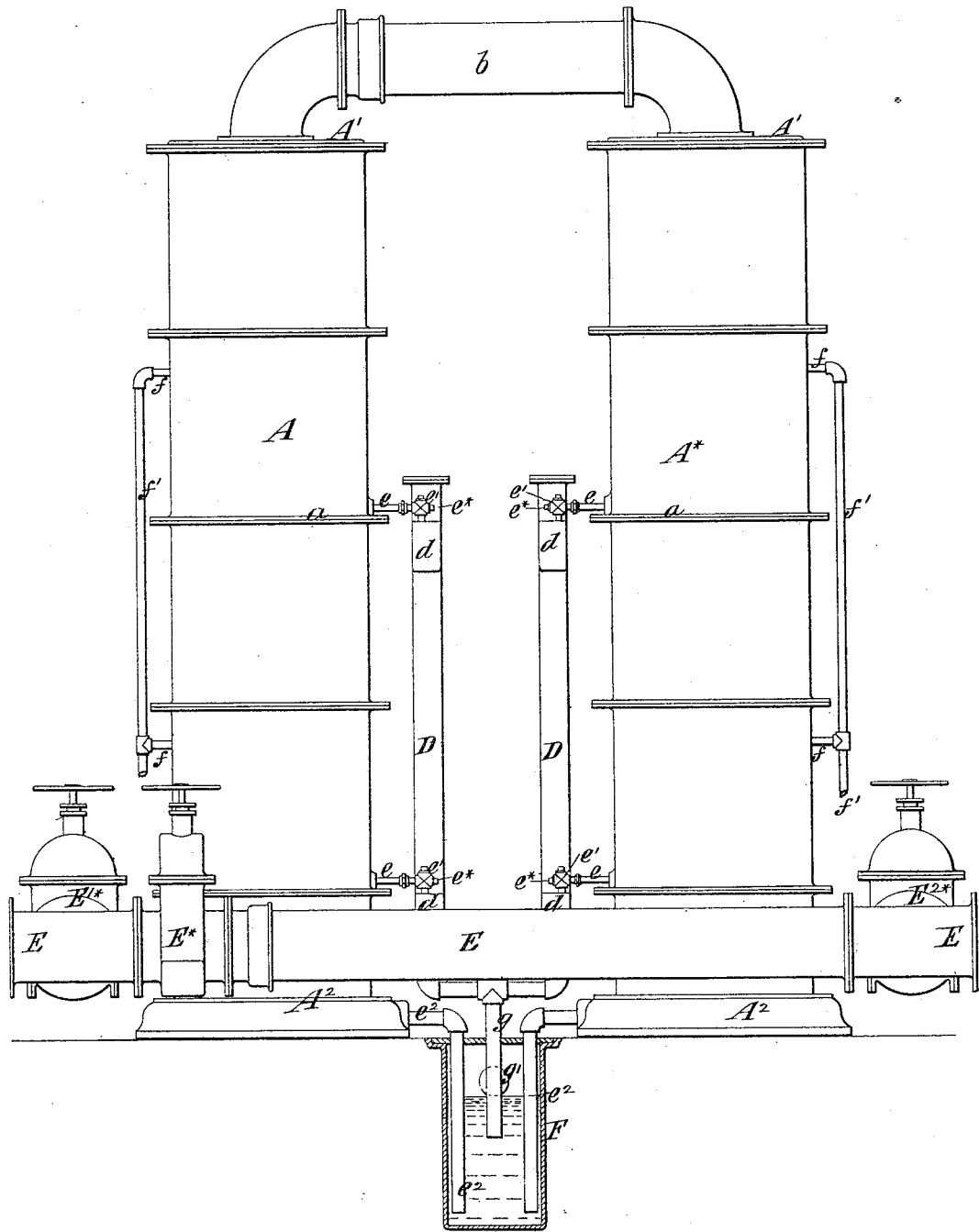

(No Model.)  C. W. ISBELL.  3 Sheets—Sheet 3.
GAS SCRUBBER.
No. 328,408. Patented Oct. 13, 1885.
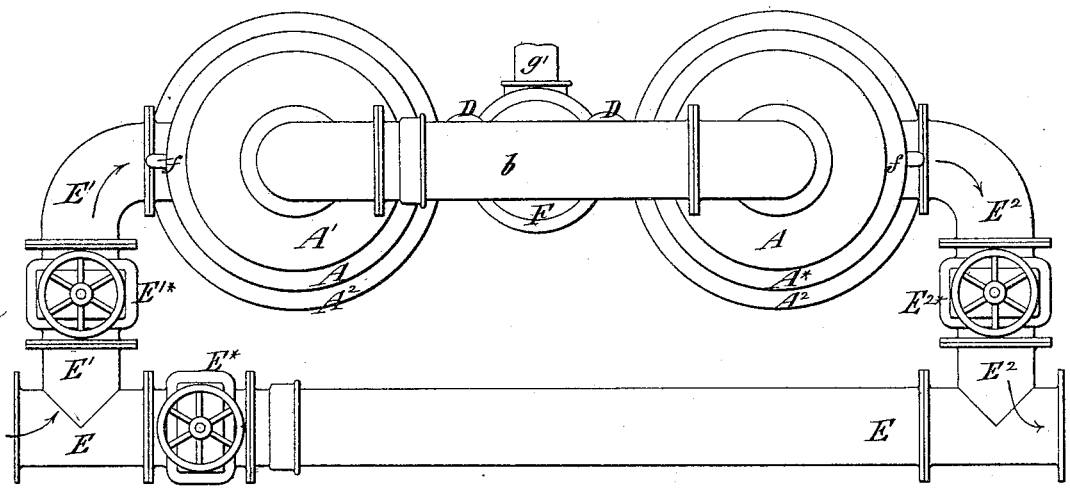

UNITED STATES PATENT OFFICE.

CHARLES W. ISBELL, OF NEW YORK, N. Y.

GAS-SCRUBBER.

SPECIFICATION forming part of Letters Patent No. 328,408, dated October 13, 1885.

Application filed February 20, 1885. Serial No. 156,490. (No model.)

*To all whom it may concern:*

Be it known that I, CHARLES W. ISBELL, of the city and county of New York, in the State of New York, have invented a new and useful Improvement in Gas-Scrubbers, of which the following is a specification.

In the operation of gas-scrubbing the removal of ammonia in the form of ammoniacal liquor is effected with comparative ease, but the tar which is held in suspension by the gas is much more difficult of removal therefrom.

The object of my invention is to provide a scrubber which is of comparatively small size for the work which it will perform, and through which gas may be passed after it has been passed through the ordinary wet scrubbers, for the purpose of removing any tar which may still be held in suspension; or, if desired, I may employ water in this scrubber, and by it effect the removal of both the ammonia and the tar from the gas without recourse to any other scrubber. It can also be used as a scrubber and condenser.

The apparatus in the form which I now deem preferable comprises an upright casing or shell, of cylindric or other form, in which are transverse partitions at different points in its height, dividing it into several compartments, and concentric series of perforated, reticulated, or foraminous metal, forming screens for the casing. Alternate partitions have central openings, and intermediate partitions have a series of openings outside of and around the concentric series of screens arranged in the compartments; hence gas, after entering the base of the apparatus, passes, for example, through a partition having a central opening, thence outward through one series of concentric screens and upward through the series of openings in the next partition, thence inward through the next series of concentric screens to the center thereof, and through the central opening of the next partition, and so on, passing through the successive series of screens alternately inward and outward until it makes its exit from the scrubber. I also combine with the apparatus, as described, pipes whereby water is injected thereinto against closed or imperforated portions of the transverse partitions, and is thereby sprayed so as to effect the removal of the ammonia from the gas. I also combine with the parts of the apparatus above described a system of overflow or drip pipes and tar-wells, constructed and combined as particularly hereinafter described, whereby tar will be automatically and continuously removed from the apparatus, and whereby said drip-pipes will be kept sealed, so that the gas cannot escape from them.

Figure 2:
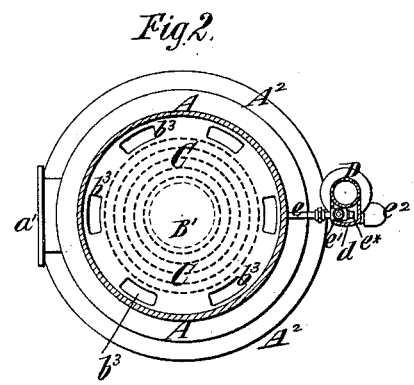
Figure 3:
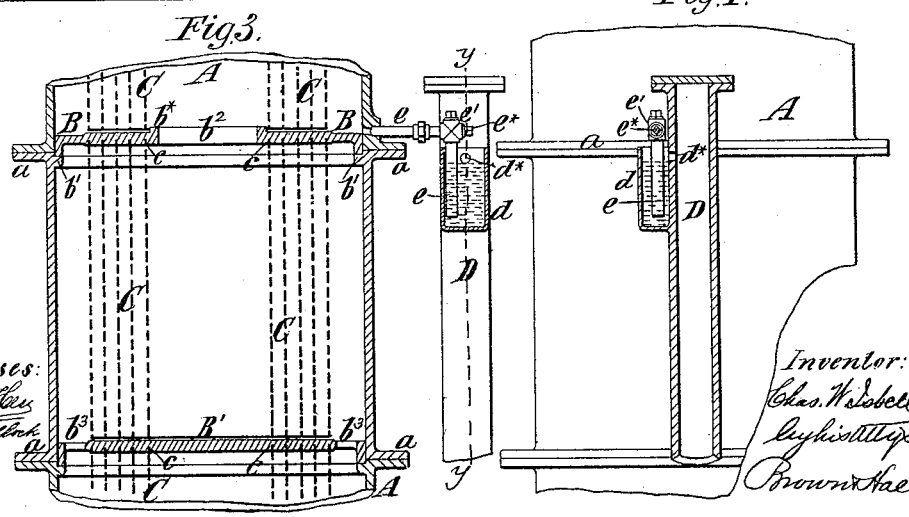
Figure 4:
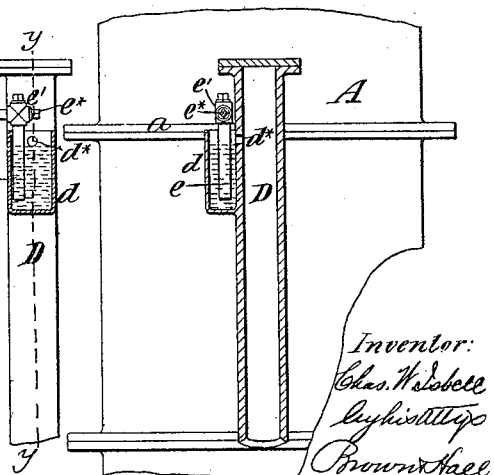

In the accompanying drawings, Figure 1 represents a vertical section of the single tower or casing and appurtenances embodying my invention. Fig. 2 represents a transverse section thereof upon the dotted line *x x*, Fig. 1. Fig. 3 is a vertical section, upon a larger scale than Fig. 1, of a portion of the apparatus, to show more clearly its construction. Fig. 4 is a vertical section upon the plane of the dotted line *y y*, Fig. 3, and upon the same scale as Fig. 3. Fig. 5 is an elevation, partly in section, of two towers or casings, such as are shown in Figs. 1 and 2, and connected so that gas will pass through them in succession, and Fig. 6 is a plan of the apparatus shown in Fig. 5.

Similar letters of reference designate corresponding parts in all the figures.

Referring now to Figs. 1 to 4, inclusive, A designates a vertical tower or casing, which may be of cylindric or other transverse section, and is or may be composed of cast-iron sections united by flanged joints *a*. The top of the tower or casing is closed by a head, A', from which extends a pipe, *b*, and at the bottom of the tower or casing is a base portion, A², which is provided with an inlet-pipe, *a'*, for gas.

In the tower or casing are transverse or horizontal partitions B B', arranged one above another, and extending entirely across the casing. These partitions may also be of cast-iron, and they may rest on inwardly-projecting flanges or ribs *b'*, provided on the sections of the casing A, as shown in Fig. 3. The tower or casing is thus divided into a number or series of compartments, arranged one above another. In these compartments are concentric series of screens C, which extend from one partition to another, and may consist of cylinders of different sizes arranged one outside of another. These screens may be composed of finely-perforated sheet metal, or of fine wire-cloth, or other reticulated or foraminous material.

In the partitions B are central openings or apertures, $b^2$, large enough for the passage of gas, and which are wholly within the innermost or smallest screen of each series C.

In the partitions B' are circular series of openings $b^3$, which are outside of or beyond the largest screen of each series C, and which in the aggregate form an area of opening equal to that of the openings $b^2$. Each partition B has around its opening $b^2$ a raised rib or flange, $b^*$, and the lower ends of the screens of each series C will preferably be raised very slightly from the partitions B and B'.

The upper ends of the screens of each series will preferably be secured in annular grooves in the partitions B and B', as best shown at $c$ in Fig. 3. The course taken by the gas in passing through the apparatus is indicated by the arrows in Fig. 1. The gas enters at the inlet $a'$, passes up through the central opening, $b^2$, of the first partition B, then laterally outward through the screens of the first series C, thence upward through the series of openings $b^3$ of the next partition B' and inward through the screens of the second series C, and so on, until it finally makes its exit from the pipe $b$ at the top of the apparatus.

By the repeated passage of the gas through the several series of screens any tar which is held in suspension will be caught or entangled in the fine openings of the screens and flow downward until it reaches the partitions B or B' at the lower ends of the screens of that series. The partitions B' have flat upper surfaces, and the tar will flow downward through the openings $b^3$ therein. The raised rib $b^*$, around the opening $b^2$ in each partition B, will prevent the tar from passing any farther, and the tar will be automatically or continously removed by the arrangement of parts, which I will now describe.

At the side of the apparatus is a stand-pipe or cylinder, D, which is provided on its side with a small well or pocket, $d$, opposite each partition B. Each well or pocket $d$ communicates, near its upper open end, with the pipe D by the passage $d^*$, and through this passage tar will flow from the well or pocket into the stand-pipe D, thereby preventing the well or pocket from overflowing. From the casing A, on a level with the top of each partition B, extends a small overflow-pipe, $e$, leading downward into the well or pocket $d$. In each overflow-pipe $e$ is a T-fitting, $e'$, the outer branch of which is closed by a plug, $e^*$, and should any of the overflow or drip pipes become stopped, the plug $e^*$ can be removed and a wire or splinter run through them, removing the obstruction. The overflow or drip pipe $e$ extends downward into the well or pocket $d$, so that it is sealed to prevent the escape of gas, and in this way tar is prevented from accumulating in the apparatus and is automatically and continuously removed. Any tar which may be deposited in the base $A^2$ of the apparatus will be conducted away by the pipe $e^2$.

When the apparatus is designed to remove tar only, no water is discharged thereinto, but when it is designed to employ it also to free the gas from ammonia, water may be discharged forcibly against the imperforate centers of the several partitions B', by means of injecting-pipes $f$, which, through the common supply-pipe $f'$, are supplied with water under pressure from any suitable source.

In Figs. 5 and 6 I represent two vertical towers or casings, A A*, each of which is constructed and comprises appurtenances, as shown in the figures before referred to, and through which the gas may pass successively. These two towers or casings are connected at their upper ends by a pipe, $b$. E designates the main gas-pipe through which the gas is received from the hydraulic main, and from this pipe a branch, E', extends to the base of the tower or casing A, and from the tower or casing A* a branch, E$^2$, extends to the main pipe E. In the pipe E is a valve, E*, and in the branch pipes E' and E$^2$ are valves E'* E$^2$*. The stand-pipes or tar-escape pipes D are connected at their lower ends with a pipe, $g$, extending downward into the tar-pot F, and the tar-pipes $e^2$, extending from the base of the two towers or casings, also deliver into the tar-pot F. The tar-pot F has an overflow-opening, $g'$, through which its contents escape to the tar-well.

In the use of the apparatus arranged as described, the valve E* would be closed and the valves E'* and E$^2$* open. Gas from the pipe E, flowing in the direction of the arrow, Fig. 6, would then be passed through the branch E' to the base of the tower A, thence upward through this tower and through the pipe $b$ to the tower A*, and finally would make its exit from the base of the tower A* through the branch pipe E$^2$ to the main pipe E.

Two or more pairs of scrubbing-towers might be connected, as described, with one main pipe E, and, in case it be desired to discontinue the use of one pair for repair or other purposes, the valves E'* and E$^2$* would be closed, and the valve E* opened, and gas would flow through the pipe E past the pair of towers shown as connected therewith, and on to the next pair of towers.

What I claim as my invention, and desire to secure by Letters Patent, is—

1. In a gas-scrubber, the combination, with a tower or casing having a gas-inlet at one end and a gas-outlet at the other end, of series of transverse partitions in the tower or casing, a series of screens extending between the partitions, alternate partitions being provided with central openings within the series of screens, and intermediate partitions being provided with openings outside of or beyond the series of screens, whereby the gas in its passage through the tower or casing is caused to take a circuitous course and pass repeatedly through the screens, substantially as herein described.

2. In a scrubber, the combination, with a tower or casing having a gas-inlet at one end and a gas-outlet at the other end, of transverse partitions and series of screens extending between them, the partitions being provided with openings alternately within and outside of the screens, and pipes for spraying water within the series of screens, substantially as herein described.

3. The combination, with a tower or casing, A, and partitions B B', respectively having openings $b^2$ $b^3$, of a series of screens, C, and pipes $f$, for injecting water against the imperforate central portion of the partitions B', substantially as herein described.

4. In a gas-scrubber, the combination, with a tower or casing provided with transverse partitions, and a series of screens extending between them, said partitions being provided alternately with openings within and outside of the screens, whereby gas is caused to pass repeatedly through the screens, as described, of tar-drip pipes extending from above these partitions, which have openings within the series of screens, and pockets or wells into which said drip-pipes depend, and which are sealed to the escape of gas, substantially as herein described.

5. In a gas-scrubber, the combination, with a tower or casing having transverse partitions and series of screens, the partitions being provided alternately with openings within and beyond the series of screens, of the stand-pipe D, constructed with wells or pockets D', external to it and communicating with it, and the drip-pipes $e$, extending from the tower or casing above partitions therein into the wells or pockets $d$, substantially as herein described.

6. In a gas-scrubber, the combination, with a tower or casing, A, having partitions and series of screens arranged one above another, as described, of the drip-pipes $e$, comprising T-fittings $e'$, the outer branches of which are closed by plugs $e^*$, and the stand-pipe D, constructed upon its side with tar-wells $d$, which communicate with its interior by openings $d^*$, and into which the drip-pipes depend, substantially as herein described.

CHAS. W. ISBELL.

Witnesses:
C. HALL,
FREDK. HAYNES.